United States Patent [19]

Reinl

[11] Patent Number: 5,176,482
[45] Date of Patent: Jan. 5, 1993

[54] MOUNTING ASSEMBLY FOR MOTOR VEHICLES

[75] Inventor: Hans G. Reinl, Bergheim, Fed. Rep. of Germany

[73] Assignee: Ford Motor Company, Dearborn, Mich.

[21] Appl. No.: 615,940

[22] Filed: Nov. 21, 1990

[30] Foreign Application Priority Data

Nov. 21, 1989 [DE] Fed. Rep. of Germany ....... 3938547

[51] Int. Cl.⁵ ............................................ F16B 39/24
[52] U.S. Cl. .................................. 411/170; 411/172; 411/523; 403/406.1; 403/408.1
[58] Field of Search ............... 403/406.1, 407.1, 408.1; 411/170, 172, 523

[56] References Cited

U.S. PATENT DOCUMENTS

| | | | |
|---|---|---|---|
| 2,062,685 | 12/1936 | Tinnerman | 411/172 X |
| 2,258,845 | 10/1941 | Burke | 411/172 |
| 3,314,465 | 4/1967 | Bien | 403/406.1 X |
| 4,348,140 | 9/1982 | Bergholz et al. | 403/408.1 X |
| 4,396,326 | 8/1983 | McKinnie, III et al. | 411/103 |
| 4,437,783 | 3/1984 | Peterson | 403/408.1 |
| 4,657,296 | 4/1987 | Nishii et al. | 411/172 X |
| 4,729,706 | 3/1988 | Peterson et al. | 411/523 X |
| 4,897,005 | 1/1990 | Peterson et al. | 411/523 X |

FOREIGN PATENT DOCUMENTS

| | | |
|---|---|---|
| 1575302 | 2/1970 | Fed. Rep. of Germany . |
| 1554648 | 2/1971 | Fed. Rep. of Germany . |
| 3536473 | 4/1987 | Fed. Rep. of Germany ... 403/408.1 |
| 2087024 | 5/1982 | United Kingdom ................ 411/523 |

Primary Examiner—Randolph A. Reese
Assistant Examiner—Heather Chun
Attorney, Agent, or Firm—Daniel M. Stock; Roger L. May

[57] ABSTRACT

In a component mounting in motor vehicle bodies with a sheet metal nut and a screw bolt, wherein the sheet metal nut has in its base plate a funnel-shaped relief preceding the tubular projection comprising the thread and a holding arm preceding the base plate and comprising a through-opening, and the screw bolt is provided with a point, and the sheet metal nut is provided in the holding arm preceding the funnel-shaped relief with a through-opening which corresponds approximately to the size of the external diameter of the funnel-shaped relief, and the sheet metal nut is held in a restricted and readily movable manner on the body sheet by a holding opening and lateral beads in a region corresponding approximately to the difference between the internal and external diameters of the funnel-shaped relief.

4 Claims, 1 Drawing Sheet

U.S. Patent  Jan. 5, 1993  5,176,482
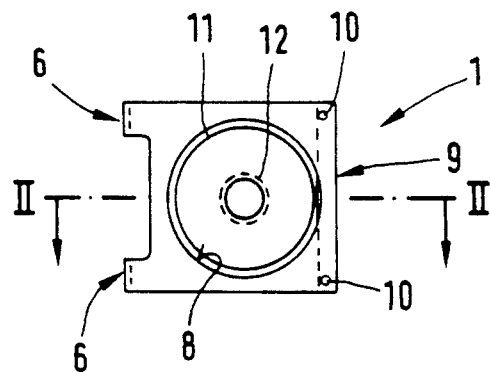
FIG.1
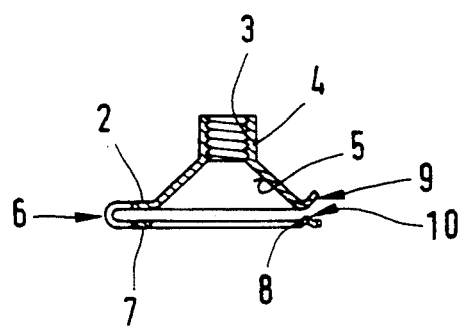
FIG.2
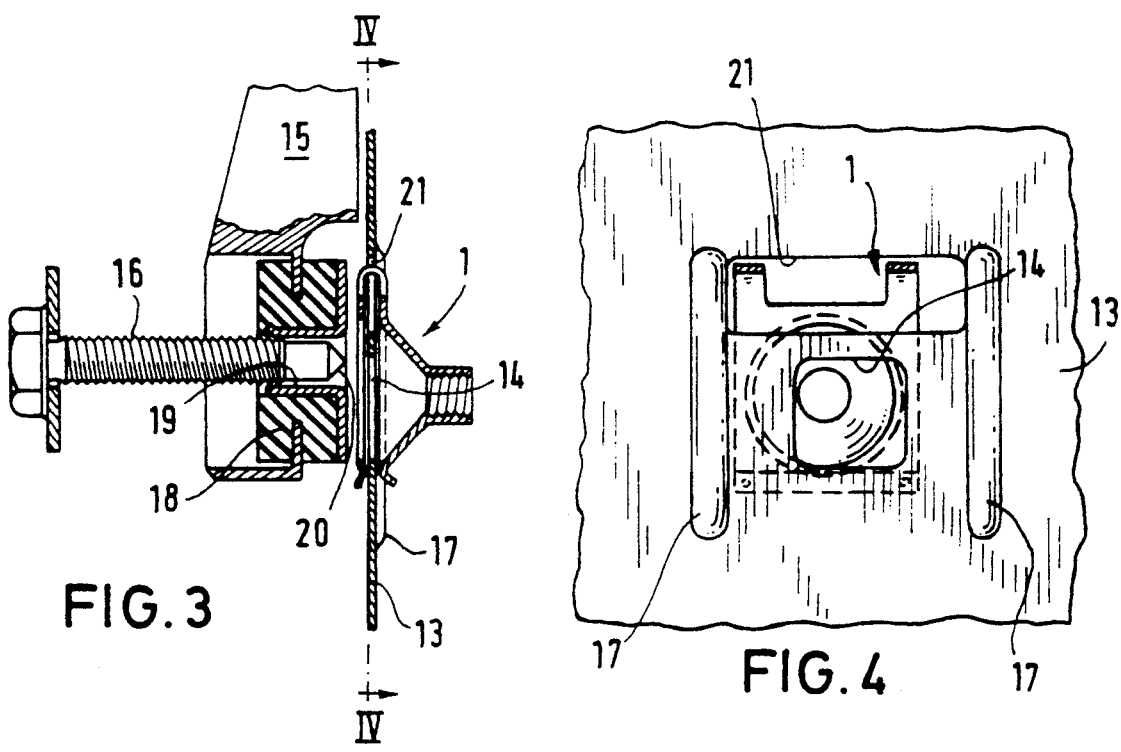
FIG.3
FIG.4

MOUNTING ASSEMBLY FOR MOTOR VEHICLES

BACKGROUND OF THE INVENTION

1. Field of the Invention

The invention relates generally to component mounting in motor vehicle bodies and more particularly to such mountings in which a sheet metal nut and a screw are utilized.

2. Description of the Related Art

A sheet metal nut is known from German Application DE A1 15 75 302, which has on its base plate a funnel-shaped relief preceding a tubular projection which includes the thread of the nut and is capable of cooperating in the conventional manner with a screw having a point.

However, the known sheet metal nut has the disadvantage that the through-opening in its holding arm is too small to utilize the funnel-shaped relief to orientate a screw bolt with respect to the threaded part of the sheet metal nut during assembly.

A special sheet metal nut for mounting handles on pots is known from DE A1 15 54 648 in which a conical nose cooperates with a slot on the mounting part such that the handle is pressed closely onto the pot when the screw is tightened.

SUMMARY OF THE INVENTION

The object of the invention is to provide an improved component mounting assembly in motor vehicle bodies that uses a sheet metal nut having a funnel-shaped relief adjacent the nut threaded portion such that the sheet metal nut may be clamped onto body panels of the vehicle in a concealed arrangement and can be orientated in close tolerances according to the position predetermined by mounting bores formed on the component during the assembly of the component on the vehicle with an attaching screw.

This object is achieved in the automotive component mounting environment by providing a sheet metal nut that has, in a holding arm preceding a funnel-shaped relief, a through-opening of approximately the size of the external diameter of the funnel-shaped relief and the sheet metal nut is held in a restricted and readily movable manner on the body sheet by a mounting opening and adjacent lateral beads arrayed in a region corresponding in size approximately to the difference between the internal and external diameters of the funnel-shaped relief.

This construction ensures that considerable tolerance accumulation can be accommodated, for example, in the case of a windshield wiper motor which is to be fixed on a body panel in which the wiper shaft is centered by a predetermined through-opening and which has three mounting arms having through bores for the screw bolts which are to be introduced into sheet metal nuts applied to the body sheet, a secure mounting can be accomplished even though the position of the through-openings in the body sheet, the position of the manually applied sheet metal nuts and the position of the through-bores in the mounting arms have quite considerable tolerance accumulations.

BRIEF DESCRIPTION OF THE DRAWINGS

The invention is described in more detail with reference to the embodiment shown in the drawings.

FIG. 1 shows a plan view of a sheet metal nut according to the invention.

FIG. 2 shows a section along the line II—II is FIG. 1.

FIG. 3 shows a section illustrating the component mounting during assembly.

FIG. 4 shows a view of the region of the body plate in which a sheet metal nut according to the invention is arranged.

DESCRIPTION OF A PREFERRED EMBODIMENT

As may be seen in FIGS. 1 and 2, a sheet metal nut 1 according to the invention consists essentially of a base plate 2 on which a tubular projection 4 having a thread 3 is embossed or otherwise formed. The tubular projection 4 is preceded by a funnel-shaped relief 5 positioned integrally between the tubular projection 4 and the base plate 2.

A holding arm 7 folded through 180° via two arcs 6 is constructed integrally with the base plate 2 and lies parallel to the base plate 2 and has a through-opening 8.

A canted region 9 simplifying the installation of the sheet metal nut 1 is provided on the base plate 2 and two humps 10 reducing static friction are provided on the holding arm 7.

According to the invention, the dimensions of the through-opening 8 in the holding arm 7 are at least as great as the external diameter 11 of the funnel-shaped relief 5 on the base plate 2. The internal diameter 12 of the funnel-shaped relief is substantially the same as the diameter of the thread 3.

FIG. 3 shows vehicle component mounting according to the invention during assembly. A through-bore 14 for the screw bolt 16 fixing a component 15, a holding opening 21 and lateral beads 17 which prevent excessive movement of the sheet metal nut 1 are stamped next to one another on a body panel 13.

Through-bores 19 for the screw 16 are arranged, for example, in silent blocks 18 on the component 15 or on mounting arms thereof. The screw 16 is illustrated as being provided with a point 20.

With reference to FIG. 3, the position of the through-bores 19 is determined by the desired position of the component 15. The point 20 of the screw 16 inserted into these through-bores strikes the funnel-shaped relief 5 on the base plate 2 of the sheet metal nut 1. As the sheet metal nut 1 is inserted in a holding opening 21 and held in a readily movable manner on the body panel 13, movement of the sheet metal nut 1 is brought about by the pressure of the tool used to drive the screw 16, and the screw 16 can be screwed into the thread 3 of the sheet metal nut 1. The width of the holding opening 21 limits the movement of the sheet metal nut 1 at the top and bottom, as may best be seen in FIG. 4.

Lateral beads 17 in the body sheet 13 are arranged with such spacing that the sheet metal nut 1 can move laterally (right-left in FIG. 4) only sufficiently far for the screw 16 penetrating the through-opening 14 invariably to meet the funnel-shaped relief 5 in a reliable manner.

As shown in FIG. 4, the holding opening 21, the lateral beads 17 and the through-opening 14 in the body panel 13 are designed such that the sheet metal nut 1 can orientate itself under the influence of the screw 16 in position with respect to the body panel 13.

I claim:

1. An improved mounting assembly for mounting components in motor vehicle bodies comprising a sheet metal nut having a base plate and a holding arm arranged in parallel spaced relationship, the base plate having a tubular threaded projection formed therein and a funnel shaped relief having internal and external diameters arranged in axially adjacent relationship with respect to the projection, and the holding arm having a through opening arranged in axially adjacent relationship with respect to the base plate tubular threaded projection and funnel-shaped relief, the through opening being sized approximately equal to the external diameter of the funnel shaped relief, a screw receivable through said nut through opening and threadedly engageable with said nut base plate tubular threaded projection, and projection means defined on the vehicle body for holding the sheet metal nut on the vehicle body and for permitting lateral movement of the sheet metal nut with respect to the body a distance no greater than approximately equal to the difference in dimension between the internal and external diameters of the funnel-shaped relief.

2. An improved mounting assembly as defined in claim 1 wherein said means for holding comprises a holding opening formed through a portion of the vehicle body.

3. An improved mounting assembly as defined in claim 1 wherein said means for holding comprises a holding opening formed through a portion of the vehicle body and further comprising a pair of laterally spaced beads formed on the body portion adjacent the holding opening to limit movement of the sheet metal nut with respect to the body.

4. A component mounting assembly in a motor vehicle body comprising:
   a sheet metal nut including:
   a base plate having a threaded tubular projection formed therein and a funnel-shaped relief having internal and external diameters arranged axially adjacent the threaded tubular projection, and
   a holding arm arranged axially adjacent the base plate and having a through opening of approximately the same diameter as the external diameter of the funnel-shaped relief;
   a screw bolt threadedly engageable with the nut;
   means defining a holding opening in the body receiving the nut; and
   a pair of beads laterally spaced with respect to the holding to limit movement of the sheet metal nut with respect to the body to a distance approximately equal to the difference between the internal and external diameters of the funnel-shaped relief.

* * * * *